United States Patent Office 3,471,552
Patented Oct. 7, 1969

3,471,552
ALIPHATIC POLYPHOSPHONIC ACIDS AND
DERIVATIVES THEREOF
Edward G. Budnick, Garwood, N.J., assignor to Plains
Chemical Development Co., Garwood, N.J., a corporation of New Jersey
No Drawing. Filed Aug. 24, 1965, Ser. No. 482,257
Int. Cl. C07f 9/38, 9/40; C08k 1/60
U.S. Cl. 260—502.4                          14 Claims

ABSTRACT OF THE DISCLOSURE

Compounds are prepared having a formula selected from the group consisting of

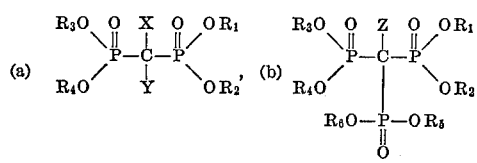

and

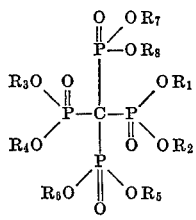

where $R_1$, $R_2$, $R_3$, $R_4$, $R_5$, $R_6$, $R_7$ and $R_8$ are selected from the group consisting of hydrogen, hydrocarbyl, haloaryl, metal, ammonium and hydrocarbyltin; X is a halogen of atomic weight from 35 to 80; Y and Z are each selected from the group consisting of hydrogen and halogen of atomic weight from 35 to 80.

This invention relates to the preparation of novel polyphosphonic acids and derivatives thereof.

It is an object of the present invention to prepare novel polyphosphonic acids.

Another object is to prepare novel esters of polyphosphonic acids.

A further object is to prepare novel salts of polyphosphonic acids.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the following formulae

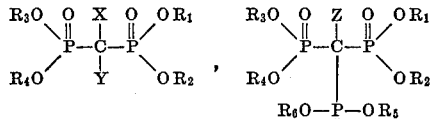

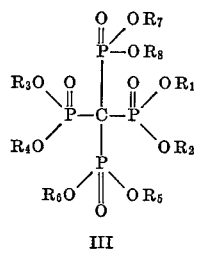

where $R_1$, $R_2$, $R_3$, $R_4$, $R_5$, $R_6$, $R_7$ and $R_8$ are hydrogen hydrocarbyl, e.g., alkyl and aryl; haloaryl, metal, ammonium or hydrocarbyltin, e.g., alkyl or aryltin such as dialkyltin, X is chlorine or bromine, Y is hydrogen, chlorine or bromine and Z is hydrogen, chlorine or bromine.

The esters of Formula I are conveniently prepared by reacting 1 mole of chloroform, carbon tetrachloride, bromoform or carbon tetrabromide with 2 moles of a dialkyl phosphite, a diaryl phosphite or a di(haloaryl) phosphite.

The esters of Formulas II and III are conveniently prepared by reacting 1 mole of chloroform, carbon tetrachloride, bromoform or carbon tetrabromide with 3 to 4 moles or more of a dialkyl phosphite, diaryl phosphite, or di(haloaryl)phosphite. Generally a mixture of the esters of Formulas II and III are obtained with the use of increasing amounts of the dialkyl phosphite or the like favoring an increased proportion of the compounds of Formula III in the product. The esters of Formula II can be separated from the esters of Formula III by chromatographic absorption or other conventional techniques, e.g., repeated fractional crystallization.

The free acids of Formulas I, II and III can be readily prepared by hydrolyzing the esters of the same formula. Preferably the lower alkyl esters are used for such hydrolysis. The hydrolysis is preferably carried out with the aid of an acid catalyst, e.g., hydrochloric acid, sulfuric acid or the like.

The salts of Formulae I, II and III can be prepared quite readily by placing an aqueous or organic solution of a salt of the appropriate metal in contact with the free acid of Formulas I, II or III or with an alkali metal salt thereof.

As the starting secondary phosphites there can be used dimethyl phosphite, diethyl phosphite, dipropyl phosphite, dibutyl phosphite, diisobutyl phosphite, ditertiary butyl phosphite, disecondary butyl phosphite, diamyl phosphite, dihexyl phosphite, dicyclohexyl phosphite, dioctyl phosphite, diisodecyl phosphite, didecyl phosphite, dioctadecyl phosphite, diphenyl phosphite, di-p-cresyl phosphite, di(p-nonylphenyl)phosphite, di(o-dodecylphenyl)phosphite, di-(m-octylphenyl)phosphite, di(p-chlorophenyl)phosphite, di(2,4,6 - trichlorophenyl)phosphite, di(2,4,5-tribromophenyl)phosphite, (dibenzyl)phosphite.

Examples of compounds within the present invention are chloromethane diphosphonic acid,
dichloromethane diphosphonic acid,
bromomethane diphosphonic acid,
dibromomethane diphosphonic acid,
chloromethane triphosphonic acid,
bromomethane triphosphonic acid,
methane triphosphonic acid,
methane tetraphosphonic acid,
tetramethyl chloromethane diphosphonate,
tetraethyl chloromethane diphosphonate,
tetrapropyl chloromethane diphosphonate,
tetrabutyl chloromethane diphosphonate,
tetrahexyl chloromethane diphosphonate, tetraoctyl chloromethane diphosphonate,
tetra iodecyl chloromethane diphosphonate,
tetra octadecyl chloromethane diphosphonate,
tetra butyl bromomethane diphosphonate,
tetraphenyl chloromethane diphosphonate,
tetra (m-cresyl) chloromethane diphosphonate,
tetra (p-butylphenyl) chloromethane diphosphonate,
tetra (p-nonylphenyl) chloromethane diphosphonate,
tetra (p-dodecylphenyl) chloromethane diphosphonate,
tetra benzyl chloromethane diphosphonate,
tetra (p-chlorophenyl) chloromethane diphosphonate,
tetra (2,4,6-trichlorophenyl) chloromethane diphosphonate,
tetra (2,4,5-tribromophenyl) chloromethane diphosphonate,
tetramethyl dichloromethane diphosphonate,
tetraethyl dichloromethane diphosphonate,
tetrapropyl dichloromethane diphosphonate,
tetrabutyl dichloromethane diphosphonate,
tetra isobutyl dichloromethane diphosphonate,
tetra tertiary butyl dichloromethane diphosphonate,
tetraamyl dichloromethane diphosphonate,
tetrahexyl dichloromethane diphosphonate,
tetra octyl dichloromethane diphosphonate,
tetra (2-ethylhexyl) dichloromethane diphosphonate,
tetra (isodecyl) dichloromethane diphosphonate,
tetra (octadecyl) dichloromethane diphosphonate,
tetra amyl dibromomethane diphosphonate,
tetraphenyl dichloromethane diphosphonate,
tetra (p-cresyl) dichloromethane diphosphonate,
tetra (p-octylphenyl) dichloromethane diphosphonate,
tetra (o-tetradecylphenyl) dichloromethane diphosphonate,
tetra benzyl dichloromethane diphosphonate,
tetra (o-chlorophenyl) dichloromethane diphosphonate,
tetra (2,4,6-trichlorophenyl) dichloromethane diphosphonate,
tetra (2,4,5-tribromophenyl) dichloromethane diphosphonate,
tetra (m-cresyl) dibromomethane diphosphonate,
di(isodecyl) diphenyl dichloromethane diphosphonate,
hexamethyl chloromethane triphosphonate,
hexaethyl chloromethane triphosphonate,
hexapropyl chloromethane triphosphonate,
hexaisopropyl chloromethane triphosphonate,
hexabutyl chloromethane triphosphonate,
hexa secondary butyl chloromethane triphosphonate,
hexa tertiary butyl chloromethane triphosphonate,
hexa amyl chloromethane triphosphonate,
hexa hexyl chloromethane triphosphonate,
hexa heptyl chloromethane triphosphonate,
hexa octyl chloromethane triphosphonate,
hexa (decyl) chloromethane triphosphonate,
hexa (isodecyl) chloromethane triphosphonate,
hexa (tetradecyl) chloromethane triphosphonate,
hexa propyl bromomethane triphosphonate,
hexaphenyl chloromethane triphosphonate,
di octyl tetra phenyl chloromethane triphosphonate,
hexa (p-cresyl) chloromethane triphosphonate,
hexa (o-butylphenyl) chloromethane triphosphonate,
hexa (p-nonylphenyl) chloromethane triphosphonate,
hexa (p-tetradecylphenyl) chloromethane triphosphonate,
hexa (cyclohexyl) chloromethane triphosphonate,
hexa benzyl chloromethane triphosphonate,
hexa (p-chlorophenyl) chloromethane triphosphonate,
hexa (2,4,6-trichlorophenyl) chloromethane triphosphonate,
hexa (2,4,6-tribromophenyl) bromomethane triphosphonate,
hexamethyl methane triphosphonate,
hexaethyl methane triphosphonate,
hexapropyl methane triphosphonate,
hexabutyl methane triphosphonate,
hexaamyl methane triphosphonate,
hexa isobutyl methane triphosphonate,
hexa secondary butyl methane triphosphonate,
hexa tertiary butyl methane diphosphonate,
hexa hexyl methane triphosphonate,
hexa octyl methane triphosphonate,
hexa (isodecyl) methane triphosphonate,
hexa (dodecyl) methane triphosphonate,
hexa (octadecyl) methane triphosphonate,
hexaphenyl methane triphosphonate,
di (decyl) tetraphenyl methane triphosphonate,
hexa (p-propylphenyl) methane triphosphonate,
hexa (m-cresyl) methane triphosphonate,
hexa (p-nonylphenyl) methane triphosphonate,
hexa (p-dodecylphenyl) methane triphosphonate,
hexa (cyclohexyl) methane triphosphonate,
hexa (benzyl) methane triphosphonate,
hexa (o-chlorophenyl) methane triphosphonate,
hexa (2,4,6-trichlorophenyl) methane triphosphonate,
hexa (p-bromophenyl) methane triphosphonate,
octamethyl methane tetraphosphonate,
octaethyl methane tetraphosphonate,
octa propyl methane tetraphosphonate,
octa butyl methane tetraphosphonate,
octa amyl methane tetraphosphonate,
octa isobutyl methane tetraphosphonate,
octa secondary butyl methane tetraphosphonate,
octa tertiary butyl methane tetraphosphonate,
octa hexyl methane tetraphosphonate,
octa (isodecyl) methane tetraphosphonate,
octa (dodecyl) methane tetraphosphonate,
octa (octadecyl) methane tetraphosphonate,
octaphenyl methane tetraphosphonate,
tetra (isodecyl) tetraphenyl methane tetraphosphonate,
octa (p-ethylphenyl) methane tetraphosphonate,
octa (o-cresyl) methane tetraphosphonate,
octa (p-nonylphenyl) methane tetraphosphonate,
octa (p-dodecylphenyl) methane tetraphosphonate,
octa (cyclohexyl) methane tetraphosphonate,
octa (benzyl) methane tetraphosphonate,
octa (p-chlorophenyl) methane tetraphosphonate,
octa (2,4,6-trichlorophenyl) methane tetraphosphonate,
octa (m-bromophenyl) methane tetraphosphonate.

There are also included within the invention salts of the novel acids. These salts can be made from any of the metals in the periodic system. Thus there can be prepared alkali metal salts such as lithium, sodium, potassium, rubidium and cesium salts, alkaline earth metal salts such as calcium, barium, strontium and magnesium, as well as salts of the metals such as zinc, cadmium, mercury, copper, silver, gold, titanium, zirconium, tin, chromium, tungsten, molybdenum, radium, manganese, iron, cobalt, nickel, platinum, palladium, uranium and the rare earths, e.g., hafnium and cerium. Ammonium salts can also be prepared. With the exception of the alkali metals and ammonium the salts that are formed are of both ionic and chelate type.

Alkylation and aryltin salts (e.g., mono, di or trialkyltin salts) can also be made.

Illustrative examples of salts are
sodium chloromethane diphosphonate potassium chloromethane diphosphonate,
potassium chloromethane diphosphonate,
rubidium chloromethane diphosphonate,
ammonium chloromethane diphosphonate,
calcium chloromethane diphosphonate,
barium chloromethane diphosphonate,
magnesium chloromethane diphosphonate,
beryllium chloromethane diphosphonate,
zinc chloromethane diphosphonate,
cadmium chloromethane diphosphonate,
mercury chloromethane diphosphonate,
cupric chloromethane diphosphonate,
silver chloromethane diphosphonate,
auric chloromethane diphosphonate,
titanium chloromethane diphosphonate,
zirconium chloromethane diphosphonate, stannous chloromethane diphosphonate,
stannic chloromethane diphosphonate,
chromic chloromethane diphosphonate,
tungsten chloromethane diphosphonate,
molybdenum chloromethane diphosphonate,
manganous chloromethane diphosphonate,
ferrous chloromethane diphosphonate,
ferric chloromethane diphosphonate,
cobaltic chloromethane diphosphonate,
nickelous chloromethane diphosphonate,
platinum chloromethane diphosphonate,
palladium chloromethane diphosphonate,
uranium chloromethane diphosephonate,
uranyl chloromethane diphosphonate,
plumbous chloromethane diphosphonate,
hafnium chloromethane diphosphonate,
cerium chloromethane diphosphonate,
dibutyltin chloromethane diphosphonate,
monobutyltin chloromethane diphosphonate,
tributyltin chloromethane diphosphonate,
dioctyltin chloromethane diphosphonate,
diphenyltin chloromethane diphosphonate,
sodium bromomethane diphosphonate,
calcium bromomethane diphosphonate,
ferric bromomethane diphosphonate,
potassium dibromomethane diphosphonate,
barium dibromomethane diphosphonate,
cupric dibromomethane diphosphonate,
lithium dichloromethane diphosphonate,
sodium dichloromethane diphosphonate,
potassium dichloromethane diphosphonate,
cesium dichloromethane diphosphonate,
ammonium dichloromethane diphosphonate,
calcium dichloromethane diphosphonate,
magnesium dichloromethane diphosphonate,
barium dichloromethane diphosphonate,
strontium dichloromethane diphosphonate,
zinc dichloromethane diphosphonate,
beryllium dichloromethane diphosphonate,
cadmium dichloromethane diphosphonate,
mercury dichloromethane diphosphonate,
cupric dichloromethane diphosphonate,
silver dichloromethane diphosphonate,
auric dichloromethane diphosphonate,
titanium dichloromethane diphosphonate,
zirconium dichloromethane diphosphonate,
stannous dichloromethane diphosphonate,
stannic dichloromethane diphosphonate,
chromic dichloromethane diphosphonate,
tungsten dichloromethane diphosphonate,
molybdenum dichloromethane diphosphonate,
manganic dichloromethane diphosphonate,
ferrous dichloromethane diphosphonate,
ferric dichloromethane diphosphonate,
cobaltous dichloromethane diphosphonate,
nickelic dichloromethane diphosphonate,
platinum dichloromethane diphosphonate,
palladium dichloromethane diphosphonate,
uranium dichloromethane diphosphonate,
uranyl dichloromethane diphosphonate,
cerium dichloromethane diphosphonate,
hafnium dichloromethane diphosphonate,
radium dichloromethane diphosphonate,
plumbous dichloromethane diphosphonate,
dimethytin dichloromethane diphosphonate,
dioctadicyltin dichloromethane diphosphonate,
dibutyltin dichloromethane diphosphonate,
di (p-tolyl) tin dichloromethane diphosphonate,
monooctyltin dichloromethane diphosphonate,
trihexyltin dichloromethane diphosphonate,
sodium bromomethane triphosphonate,
ferric bromomethane triphosphonate,
sodium chloromethane triphosphonate,
potassium chloromethane triphosphonate,
ammonium chloromethane triphosphonate,
rubidium chloromethane triphosphonate,
cesium chloromethane triphosphonate,
lithium chloromethane triphosphonate,
calcium chloromethane triphosphonate,
magnesium chloromethane triphosphonate,
beryllium chloromethane triphosphonate,
strontium chloromethane triphosphonate,
barium chloromethane triphosphonate,
radium chloromethane triphosphonate,
zinc chloromethane triphosphonate,
cadmium chloromethane triphosphonate,
mercury chloromethane triphosphonate,
cupric chloromethane triphosphonate,
silver chloromethane triphosphonate,
aurous chloromethane triphosphonate,
titanic chloromethane triphosphonate,
zirconium chloromethane triphosphonate,
plumbous chloromethane triphosphonate,
stannous chloromethane triphosphonate,
stannic chloromethane triphosphonate,
chromic chloromethane triphosphonate,
tungsten chloromethane triphosphonate,
molybdenum chloromethane triphosphonate,
manganous chloromethane triphosphonate,
ferrous chloromethane triphosphonate,
ferric chloromethane triphosphonate,
cobaltic chloromethane triphosphonate,
nickelous chloromethane triphosphonate,
platinum chloromethane triphosphonate,
palladium chloromethane triphosphonate,
uranium chloromethane triphosphonate,
uranyl chloromethane triphosphonate,
cerium chloromethane triphosphonate,
hafnium chloromethane triphosphonate,
dibutyltin chloromethane triphosphonate,
dioctyltin chloromethane triphosphonate,
amyltin chloromethane triphosphonate,
triethyltin chloromethane triphosphonate,
di (o-tolyl) tin chloromethane triphosphonate,
sodium methane triphosphonate,
potassium methane triphosphonate,
ammonium methane triphosphonate,
lithium methane triphosphonate,
rubidium methane triphosphonate,
cesium methane triphosphonate,
calcium methane triphosphonate,
beryllium methane triphosphonate,
magnesium methane triphosphonate,
strontium methane triphosphonate,
barium methane triphosphonate,
radium methane triphosphonate,
zinc methane triphosphonate,
cadmium methane triphosphonate,
mercury methane triphosphonate,
cuprous methane triphosphonate,
cupric methane triphosphonate,
silver methane triphosphonate,
auric methane triphosphonate,
titanic methane triphosphonate,
zirconic methane triphosphonate,
plumbous methane triphosphonate,
stannous methane triphosphonate,
stannic methane triphosphonate,
chromous methane triphosphonate,
chromic methane triphosphonate,
tungsten methane triphosphonate,
molybdenum methane triphosphonate,
manganous methane triphosphonate,
manganic methane triphosphonate,
ferrous methane triphosphonate,
ferric methane triphosphonate,
cobaltous methane triphosphonate,
cobaltic methane triphosphonate,
nickelous methane triphosphonate,
nickelic methane triphosphonate, platinum methane triphosphonate,
palladium methane triphosphonate,
uranyl methane triphosphonate,
hafnium methane triphosphonate,
cerium methane triphosphonate,
dibutyltin methane triphosphonate,
dioctyltin methane triphosphonate,
diphenyltin methane triphosphonate,
dioctadecyltin methane triphosphonate,
dimethyltin methane triphosphonate,
di (m-tolyl) tin methane triphosphonate,
monobutyltin methane triphosphonate,
tributyltin methane triphosphonate,
monooctyltin methane triphosphonate,
trioctyltin methane triphosphonate,
sodium methane tetraphosphonate,
potassium methane tetraphosphonate,
ammonium methane tetraphosphonate,
rubidium methane tetraphosphonate,
cesium methane tetraphosphonate,
calcium methane tetraphosphonate,
magnesium methane tetraphosphonate,
barium methane tetraphosphonate,
strontium methane tetraphosphonate,
radium methane tetraphosphonate,
zinc methane tetraphosphonate,
cadmium methane tetraphosphonate,
mercury methane tetraphosphonate,
cuprous methane tetraphosphonate,
cupric methane tetraphosphonate,
silver methane tetraphosphonate,
aurous methane tetraphosphonate,
auric methane tetraphosphonate,
titanic methane tetraphosphonate,
zirconic methane tetraphosphonate,
plumbous methane tetraphosphonate,
stannous methane tetraphosphonate,
stannic methane tetraphosphonate,
chromous methane tetraphosphonate,
chromic methane tetraphosphonate,
beryllium methane tetraphosphonate,
tungsten methane tetraphosphonate,
molybdenum methane tetraphosphonate,
manganous methane tetraphosphonate,
manganic methane tetraphosphonate,
ferrous methane tetraphosphonate,
ferric methane tetraphosphonate,
cobaltous methane tetraphosphonate,
cobaltic methane tetraphosphonate,
nickelous methane tetraphosphonate,
nickelic methane tetraphosphonate,
platinum methane tetraphosphonate,
palladium methane tetraphosphonate,
uranium methane tetraphosphonate,
uranyl methane tetraphosphonate,
hafnium methane tetraphosphonate,
cerium methane tetraphosphonate,
niobium methane tetraphosphonate,
dibutyltin methane tetraphosphonate,
dioctyltin methane tetraphosphonate,
monobutyltin methane tetraphosphonate,
tributyltin methane tetraphosphonate,
diphenyltin methane tetraphosphonate.

The esters coming within Formulae I, II and III supra are all useful as stabilizers for halogen containing vinyl and vinylidene resins, e.g., vinylchloride resins and as stabilizers for monoolefin polymers, e.g., polyethylene, polypropylene and ethylene-propylene copolymer. For such stabilizer uses there is normally employed 0.1-10 parts of the phosphorus containing ester per 100 parts of the polymer. The esters are also useful in preparing the free acids within Formulae I, II and III.

The free acids of Formulae I, II and III are all useful as curing agents for melamine-formaldehyde and urea-formaldehyde resins. They are also valuable for forming their metal salts and as detergent additives, extractants, sequestering agents, metal complexing agents, corrosion inhibitors, chelating agents, stabilizers and the like. The alkali metal and ammonium salts are particularly valuable in detergent compositions as additives and builders. They are superior in such compositions to sodium tripolyphosphate. The free acids and alkali metal and ammonium salts are extremely valuable because of their ability to act as sequestering agents to hold polyvalent metal compounds in aqueous solution. They also are useful to prevent the hydrolysis of alkali metal polyphosphates.

The metal salts (other than the alkali metal salts) are useful in providing a means for isolating the metals in a form in which they can be readily recovered. They also are useful as a soluble source of the metals. The hydrocarbyltin salts are useful as stabilizers for halogen containing resins, e.g., vinyl chloride resins.

Since the novel acids of the present invention have 4, 6 or 8 acidic hydrogen atoms (Formulae I, II and III respectively) in making the salts one or more of the acidic hydrogen atoms can be replaced by the metal or ammonium in forming the salts. Usually all of the acidic hydrogen atoms are replaced in making the salt and unless otherwise indicated when reference is made to a salt in the present specification all of the acidic hydrogen atoms are replaced. However, it should be understood that this is not an essential part of the present invention and the invention includes the partial as well as the complete salts, e.g., mono sodium methane tetraphosphonate,
disodium methane tetraphosphonate,
trisodium methane tetraphosphonate,
tetrasodium methane tetraphonphonate,
pentasodium methane tetraphosphonate,
hexasodium methane tetraphosphonate,
heptasodium methane tetraphosphonate,
octasodium methane tetraphosphonate,
mono potassium methane tetraphosphonate,
tetra potassium methane tetraphosphonate,
octa potassium methane tetraphosphonate,
mono ammonium methane tetraphosphonate,
octa ammonium methane tetraphosphonate,
monosodium methane triphosphonate,
trisodium methane triphosphonate,
pentasodium methane triphosphonate,
hexasodium methane triphosphonate,
di potassium methane triphosphonate,
tetra potassium methane triphosphonate,
hexa potassium methane triphosphonate,
mono ammonium methane triphosphonate,
hexa ammonium methane triphosphonate,
mono sodium chloromethane triphosphonate,
tetra sodium chloromethane triphosphonate,
hexasodium chloromethane triphosphonate,
mono potassium chloromethane triphosphonate,
tri ammonium chloromethane triphosphonate,
hexa ammonium chloromethane triphosphonate,
mono sodium chloromethane diphosphonate,
disodium chloromethane diphosphonate,
trisodium chloromethane diphosphonate,
tetrasodium chloromethane diphosphonate,
mono potassium chloromethane diphosphonate,
tetra potassium chloromethane diphosphonate,
diammonium chloromethane diphosphonate,
tetra ammonium chloromethane diphosphonate,
mono sodium dichloromethane diphosphonate,
disodium dichloromethane diphosphonate,
tetrasodium dichloromethane diphosphonate,
tri potassium dichloromethane diphosphonate,
tetra potassium dichloromethane diphosphonate,
mono ammonium dichloromethane diphosphonate,
tetra ammonium dichloromethane diphosphonate The compounds of the present invention, and in particular the esters are useful as plasticizers.

The compounds of the present invention, particularly the free acids, alkali metal and ammonium salts, are useful as stabilizers for alkyl phenols, e.g., nonyl phenol, octyl phenol, dodecyl phenol, to present discoloration. All of the compounds of the present invention are useful as flame proofing agents in making polyurethanes. The free acids are useful as catalysts in polymerizing formaldehyde to make materials such as Delrin or Celcon.

EXAMPLE 1

23.0 grams (1.0 mole) of sodium metal, 90 cc. of xylene (solvent), and 80 cc. of tetrahydrofurane (solvent) were charged into a flask equipped with stirrer, thermometer, addition funnel and condenser. It was placed under a nitrogen atmosphere and then 194.2 grams (1.0 mole) of dibutyl phosphite was added over a 20 minute period. An exothermic reaction occurred which reached 60–65° C. The mixture was heated to 100° C. and was held there until no more sodium metal was visible (approximately 1 hour). Then there was added 9.7 grams of dibutyl phosphite (a 5% excess). The mixture was cooled to 65° C. and 38.46 grams (0.25 mole) of carbon tetrachloride was added over a 1 hour period. The reaction was very exothermic and the flask was cooled externally with water. The product was orange in color. Heating was continued at 70° C. for 12 hours. The product was then cooled and the sodium chloride formed (45 grams) was centrifuged off.

The organic solution was subjected to distillation in a vacuum. Terminal conditions were a pot temperature of 210° C. and a distillate temperature of 155° C. at 7 mm. of Hg. The residue in the pot amounted to 60 grams and was a mixture of octabutyl methane tetraphosphonate and hexabutyl chloromethane triphosphonate. This mixture is useful as such as a stabilizer for vinyl chloride resins or as a flame retardant agent for polyurethanes. The mixture can be separated into pure octabutyl methane tetraphosphonate and pure hexabutyl chloromethane triphosphonate by repeated fractional crystallization from a solvent, e.g., from tetrahydrofurane or from a mixture of equal parts of xylene and tetrahydrofurane.

EXAMPLE 2

The procedure of Example 1 was repeated replacing the dibutyl phosphite by an equimolar amount of dimethyl phosphite to obtain as the product a mixture of octamethyl methane tetraphosphonate and hexamethyl chloromethane triphosphonate. This mixture can be purified in the manner set forth in Example 1 to give the individual products.

EXAMPLE 3

The procedure of Example 1 was repeated replacing the dibutyl phosphite by an equimolar amount of diisodecyl phosphite to obtain as the product a mixture octa (isodecyl) methane tetraphosphonate and hexa (isodecyl) chloromethane triphosphonate. The pure tetraphosphonate can be isolated by repeated fractional crystallization as set forth in Example 1.

EXAMPLE 4

The procedure of Example 1 was repeated replacing the dibutyl phosphite by an equimolar amount of diphenyl phosphite to obtain as the product a mixture of octaphenyl methane tetraphosphonate and hexaphenyl chloromethane triphosphonate. The tetraphosphonate and triphosphonate can be separated in the manner indicated in Example 1.

EXAMPLE 5

The procedure of Example 1 was repeated but using 0.5 mole of carbon tetrachloride to obtain as the product tetrabutyl dichloromethane diphosphonate together with a small amount of hexabutyl chloromethane triphosphonate. The tetrabutyl dichloromethane diphosphonate was purified by repeated crystallization from a mixture of equal parts of xylene and tetrahydrofurane.

EXAMPLE 6

Using the same equipment as in Example 1 there were placed in the flask 23 grams (1.0 mole) of sodium metal, 90 cc. xylene and 80 cc. of tetrahydrofurane. The flask was placed under a nitrogen blanket and 194.2 grams (1.0 mole) of dibutyl phosphite added over a 35 minute period with external cooling of the exothermic reaction. The temperature was held at 103° C. for approximately 1 hour until there was no more sodium metal. Then there was added 9.7 grams (5% excess) of dibutyl phosphite and flask cooled to 50° C. There were then added 39.76 grams (0.33 mole) of chloroform over 40 minutes. The reaction was very exothermic and a temperature of 110° C. was reached. The mixture was yellow in color. External cooling was resorted to until the exotherm subsided. Then the mixture was heated at 70–75° C. for 4 hours, cooled and the sodium chloride (36 grams) centrifuged off.

The organic solution was subjected to distillation in a vacuum. Terminal conditions were a pot temperature of 208° C. and a distillate temperature of 149° C. at 7 mm. of Hg. The residue in the pot amounted to 70 grams and was a mixture of hexabutyl methane triphosphonate and tetrabutyl chloromethane diphosphonate. The mixture can be separated into pure hexabutyl methane triphosphonate and pure tetrabutyl chloromethane diphosphonate by repeated fractional crystallization from a solvent, e.g., from tetrahydrofurane or from a mixture of equal parts of xylene and tetrahydrofurane.

EXAMPLE 7

The procedure of Example 1 was repeated replacing the dibutyl phosphite by an equimolar amount of diethyl phosphite to obtain as the product a mixture of hexaethyl methane triphosphonate and tetraethyl chloromethane diphosphonate. The pure triphosphonate and diphosphonate can be isolated by repeated fractional crystallization as set forth in Example 6.

EXAMPLE 8

The procedure of Example 6 was repeated replacing the dibutyl phosphite by an equimolar amount of di (dodecyl) phosphite to obtain as the product a mixture of hexa (dodecyl) methane triphosphonate and tetra (dodecyl) chloromethane diphosphonate. The pure triphosphonate and diphosphonate can be isolated by repeated fractional crystallization as set forth in Example 6.

EXAMPLE 9

The procedure of Example 6 was repeated replacing the dibutyl phosphite by an equimolar amount of di (p-tolyl) phosphite to obtain as the product a mixture of hexa (p-tolyl) methane triphosphonate and tetra (p-tolyl) chloromethane diphosphonate. The pure triphosphonate and diphosphonate can be isolated by repeated fractional crystallization as set forth in Example 6.

EXAMPLE 10

To 30 grams of the mixture of octabutyl methane tetraphosphonate and hexabutyl chloromethane triphosphonate prepared in Example 1 there was added 1.0 mole ef concentrated (40%) hydrochloric acid and the mixture was refluxed for 12 hours. The excess acid was removed by stripping under vacuum. 20 ml. of water was added and removed in vacuo, then finally 200 ml. of benzene was added and water removed and separated by means of a Dean and Starke trap and finally the benzene was distilled over under reduced pressure to obtain as the residue a mixture of methane tetraphosphonic acid and chloromethane triphosphonic acid. This mixture was separated by crystallization from acetic acid. A small amount of ether was added to the acetic acid solution which was allowed to set overnight. The methane tetraphosphonic acid came out first. It had a neutralization No. of 2100 mg. of KOH/gm. (In the neutralization there was formed octa potassium methane tetraphosphonate.)

The chloromethane triphosphonic acid separated out from the mother liquor after a week. It had a neutralization No. of 1680 mg. of KOH/gm. (In the neutralization there was formed hexa potassium chloromethane triphosphonate.)

EXAMPLE 11

The procedure of Example 10 was repeated using 30 grams of the mixture of hexabutyl methane triphosphonate and tetrabutyl chloromethane diphosphonate to produce a mixture of methane triphosphonic acid and chloromethane diphosphonic acid. These acids were separated by fractional crystallization from acetic acid in the manner set forth in Example 10.

EXAMPLE 12

The procedure of Example 10 was repeated using 30 grams of the mixture of tetrabutyl dichloromethane diphosphonate and hexabutyl chloromethane triphosphonate to produce a mixture of dichloromethane diphosphonic acid and chloromethane triphosphonic. These acids were separated by fractional crystallization from acetic acid.

EXAMPLE 13

To 1 mole of methane tetraphosphonic acid there were added 8 moles of 10% aqueous sodium hydroxide and the mixture was evaporated to dryness to produce octasodium methane tetraphosphonate.

EXAMPLE 14

To 1 mole of chloromethane triphosphonic acid there were added 6 moles of 10% aqueous sodium hydroxide and the mixture was evaporated to dryness to produce hexasodium chloromethane triphosphonate.

EXAMPLE 15

To 1 mole methane triphosphonic acid there were added 6 moles of 10% aqueous sodium hydroxide and the mixture was evaporated to dryness to produce hexasodium methane triphosphonate.

EXAMPLE 16

To 1 mole of dichloromethane diphosphonic acid there was added 4 moles of 10% aqueous sodium hydroxide and the mixture was evaporated to dryness to produce tetrasodium dichloromethane diphosphonate.

EXAMPLE 17

To 1 mole of chloromethane diphosphonic acid there was added 4 moles of 10% aqueous sodium hydroxide and the mixture was evaporated to dryness to produce tetrasodium chloromethane diphosphonate.

EXAMPLE 18

1 mole of methane tetraphosphonic acid was dissolved in 8 moles of 10% aqueous ammonium hydroxide to produce octa ammonium methane tetraphosphonate in solution. The salt was recoverable by evaporation to dryness.

EXAMPLE 19

1 mole of methane triphosphonic acid was dissolved in 4 moles of 10% aqueous sodium hydroxide and the mixture evaporated to yield tetrasodium methane triphosphonate.

EXAMPLE 20

An aqueous lead acetate solution was mixed with an aqueous solution of octa sodium methane tetraphosphonate to form the chelated lead methane tetraphosphonate.

In similar fashion an aqueous ferric chloride solution was mixed with an aqueous solution of hexa potassium methane triphosphonate to form the chelated ferric methane triphosphonate.

EXAMPLE 21

A 5% aqueous lead acetate solution was passed through finely divided methane tetraphosphonic acid to get a gelatinous solid useful as a paint or pigment as well as a stabilizer for vinyl chloride resins.

The free acids of the present invention as well as their alkali metal salts are useful in the bright treatment of metals, e.g., nickel, aluminum and steel. They can be employed in nickel, copper and aluminum plating baths.

EXAMPLE 22

The procedure of Example 1 was repeated replacing the dibutyl phosphite by an equimolar amount of di (2,4,6-trichlorophenyl) phosphite to obtain as the product a mixture of octa (2,4,6-trichlorophenyl) methane tetraphosphonate and hexa (2,4,6-trichlorophenyl) chloromethane triphosphonate.

What is claimed is:

1. A compound having a formula selected from the group consisting of

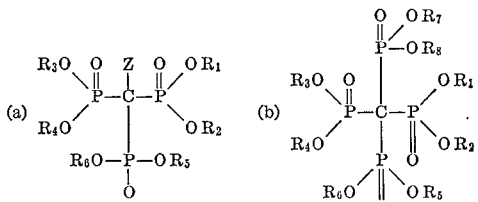

and

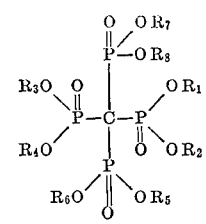

(c)

where $R_1$, $R_2$, $R_3$, $R_4$, $R_5$, $R_6$, $R_7$ and $R_8$ are selected from the group consisting of hydrogen, hydrocarbyl, haloaryl, metal, ammonium and hydrocarbyltin; and Z is selected from the group consisting of hydrogen and halogen of atomic weight from 35 to 80.

2. A compound according to claim 1 which has the Formula (a) and $R_1$, $R_2$, $R_3$, $R_4$, $R_5$ and $R_6$ are selected from the group consisting of alkyl, phenyl, alkylphenyl and chlorophenyl.

3. A compound according to claim 1 which has the Formula (b) and $R_1$, $R_2$, $R_3$, $R_4$, $R_5$, $R_6$, $R_7$ and $R_8$ are selected from the group consisting of alkyl, phenyl, alkylphenyl and chlorophenyl.

4. A compound according to claim 1 which is methane tetraphosphonic acid.

5. A compound according to claim 1 which is methane triphosphonic acid.

6. A compound according to claim 1 which is chloromethane triphosphonic acid.

7. A compound according to claim 1 which is a salt.

8. A compound according to claim 7 wherein the salt has Formula (a).

9. A compound according to claim 7 wherein the salt has Formula (b).

10. A compound according to claim 1 which is an alkali metal salt of methane tetraphosphonic acid.

11. A compound according to claim 1 which is an alkali metal salt of methane triphosphonic acid.

12. A compound according to claim 1 which is an alkali metal salt of chloromethane triphosphonic acid.

13. A compound according to claim 1 which is a phosphonic acid having 3 to 4 phosphorus atoms in the molecule.

14. A compound according to claim 1 which is an alkali metal salt of a phosphonic acid having 3 to 4 phosphorus atoms in the molecule.

References Cited

UNITED STATES PATENTS

| | | | |
|---|---|---|---|
| 2,573,568 | 10/1951 | Harman et al. | 260—970 |
| 2,599,761 | 6/1952 | Harman et al. | 260—970 |
| 2,765,279 | 10/1956 | Nusslein | 260—502.4 |
| 2,993,067 | 7/1961 | Magerlein et al. | 260—502.5 |
| 3,179,676 | 4/1965 | Stern | 260—429.7 |
| 3,251,907 | 5/1966 | Roy | 260—502.4 |
| 3,256,370 | 6/1966 | Fitch et al. | 260—502.4 |
| 3,297,578 | 1/1967 | Crutchfield et al. | 260—502.4 |

OTHER REFERENCES

Houben-Weyl: "Methoden Der Organischen Chemi," B and XII, part 1 (1963), pp. 447 to 453.

Bunyan et al.: "J. Chem. Soc." (1962), pp. 2953 to 2958.

LEON ZITVER, Primary Examiner

J. E. EVANS, Assistant Examiner

U.S. Cl. X.R.

204—45, 141; 210—57; 252—89; 260—17, 45.7, 71, 77.5, 429, 429.2, 429.3, 429.5, 429.7, 429.9, 430, 431, 435, 438, 439, 624, 932, 969, 970